United States Patent [19]
Rastall

[11] Patent Number: 5,417,520
[45] Date of Patent: May 23, 1995

[54] NUT WITH DEFORMED INTERNAL THREAD, AND METHOD OF USING SAME IN BOLT ASSEMBLY

[76] Inventor: Donald E. Rastall, 2321 Greenwood Dr., Sudbury, Ontario, Canada, P3B 1A2

[21] Appl. No.: 30,975

[22] Filed: Mar. 12, 1993

[30] Foreign Application Priority Data

Aug. 19, 1992 [CA] Canada .................................. 2076423

[51] Int. Cl.⁶ .............................................. E21D 20/02
[52] U.S. Cl. ................................ 405/259.6; 405/259.1; 411/8
[58] Field of Search ............... 405/259.1, 259.2, 259.5, 405/259.6, 302.3; 411/8, 9, 10

[56] References Cited

U.S. PATENT DOCUMENTS

| | | |
|---|---|---|
| 3,877,235 | 4/1975 | Hill . |
| 3,940,941 | 3/1976 | Libert et al. . |
| 3,979,918 | 9/1976 | Vidler . |
| 4,023,373 | 5/1977 | Hipkins . |
| 4,122,681 | 10/1978 | Vass et al. . |
| 4,618,291 | 10/1986 | Wright .......................... 405/259.2 X |
| 4,740,111 | 4/1988 | Gagnon ......................... 405/302.3 X |

FOREIGN PATENT DOCUMENTS 1187709  5/1985  Canada .

Primary Examiner—David H. Corbin
Attorney, Agent, or Firm—Bereskin & Parr

[57] ABSTRACT

A nut for use in a bolt assembly having an adhesive anchoring capsule for attaching roof or wall supports to the rock structure of a mine. The nut has deformities in its continuous internal thread that cause the continuous internal thread to bulge inwardly toward the axis of the bore. The deformities limit the advance of the nut upon a bolt and are formed by stamping dimples into one face of the nut. When an overcoming torque is applied, the deformities in the continuous internal thread are pushed radially outwardly and the nut is allowed to further advance upon the bolt. Because the deformities do not form a break in the thread, which remains continuous, no fragments are formed to damage the bolting tool, and the bolt thread remains undamaged so that a second nut can be threaded on it to hold a screen or the like.

5 Claims, 3 Drawing Sheets

NUT WITH DEFORMED INTERNAL THREAD, AND METHOD OF USING SAME IN BOLT ASSEMBLY

FIELD OF THE INVENTION

The present invention relates to bolt assemblies used in attaching supports to the roofs or walls of mines. In particular, the invention relates to a nut having at least one deformity in its internal thread that acts to limit the threaded advance of the nut upon a bolt until an overcoming torque is applied.

BACKGROUND OF THE INVENTION

Conventional bolt assemblies for securing roof or wall supports to the rock structure of a mine often incorporate an adhesive anchoring means that is inserted, along with an elongate threaded bolt, into a hole that has been bored into the rock structure. The hole and the bolt each generally have a length of about five to eight feet. The adhesive anchoring means consists generally of a thin-skinned resin capsule having a length of about twelve to twenty-four inches. The greater the length of the capsule, the greater the holding power of the adhesive anchoring means. The capsule contains unmixed quantities of a quick-setting adhesive resin and a catalyst hardener resin. A portion of the bolt extends from the hole and passes through an opening in the support. This portion of the bolt is then threadedly engaged with a nut to suspend the support from the bolt.

Means are provided to limit the threaded advance of the nut on the bolt. Rotation and upward thrusting of the nut, for instance by a power tool with an adapter such as a roof bolt dolley, thus causes the bolt to rotate within the bore hole and ruptures the resin capsule. The upper portion of the bolt is typically pointed to assist in rupturing the capsule. The resin materials are then mixed by the rotating bolt in order that they flow uniformly about the hole and the bolt. Once the resin materials have been mixed, rotation of the nut and bolt is ceased and the resin mixture is allowed to harden within the hole. The hardened mixture serves to strengthen the surrounding rock structure as well as to anchor the bolt within the hole.

When the resin mixture has hardened, an excessive torque is applied to the nut to overcome the advancement limiting means and allow further threaded advance of the nut along the bolt to tighten the roof or wall support to the rock structure.

One example of a conventional bolt assembly is described in Canadian patent 1,187,709 (Clark et al.) where the limiting means is located on the nut and consists of a frangible dome. Other examples are described in U.S. Pat. Nos. 3,877,235 (Hale) and 4,023,373 (Hipkins) where the limiting means is a frangible disk or internal nut, U.S. Pat. No. 3,940,941 (Libert et al.) where the limiting means is a discontinuity in the thread of the bolt, and U.S. Pat. No. 3,979,918 (Vidler) where the limiting means is a discontinuity in the thread of the nut.

Such conventional bolt assemblies have several disadvantages. Those that incorporate frangible elements tend to shower fragments of those elements into the body of the power tool adapter being used to rotate the nut thus filling the adapter with fragments. Those that incorporate a discontinuity in the thread of the bolt do not permit a second nut to be threaded onto the bolt to attach screening. Similarly, those that incorporate a discontinuity in the thread of the nut tend to damage the thread of the bolt so that a second nut cannot be attached. Such discontinuities in the thread of the nut may also cause broken pieces of the nut or the bolt to shower into the workings of the power tool. Finally, the limiting means of most conventional bolt assemblies tend to be relatively expensive to manufacture.

The object of the present invention is to provide an advancement limiting means that may be manufactured in a manner that is more cost-effective than the examples disclosed by the prior art. The limiting means will not be frangible so as to hinder the use of the power tool adapter (e.g. roof bolt dolley), and the limiting means will not require or cause the thread of the bolt to become damaged. In addition, the invention will provide an advancement limiting means that may be easily varied in its manufacture such that its overcoming torque may be increased or decreased according to specific applications.

SUMMARY OF THE INVENTION

In a first aspect, the present invention provides a nut, for use in a bolt assembly for attaching roof or wall supports to a rock structure of a mine, said nut comprising:
 (a) a body having first and second parallel faces, and a plurality of sides extending between said faces to define a surface for applying a torque to said body;
 (b) a bore defined through said body perpendicular to said first and second faces, said bore having a continuous internal thread adapted to threadedly receive a bolt having an external thread, said bolt being inserted into said bore from the direction of said first face; and
 (c) at least one deformity in said internal thread adjacent to said second face, said deformity in said internal thread bulging radially inwardly toward the axis of said bore, said deformity not forming a break in said internal thread;
wherein said deformity acts to limit the threaded advance of said nut along said bolt until an overcoming torque is applied, said overcoming torque pushing said deformity radially outwardly from said axis to remove at least a portion of said deformity from said internal thread.

In a second aspect, the invention provides a method of attaching roof or wall supports to a rock structure of a mine with a bolt assembly, comprising the steps of:
 (a) forming a hole in said rock structure;
 (b) placing a capsule in said hole, said capsule containing unmixed quantities of a quick-setting adhesive resin and a catalyst hardener resin;
 (c) inserting a first end of a bolt into said hole, said bolt having a threaded second end extending from said hole and through an opening in a roof or wall support;
 (d) selecting a nut having a body having first and second parallel faces, and a plurality of sides extending between said faces to define a surface for applying a torque to said body, and a bore defined through said body perpendicular to said first and second faces, said bore having a continuous internal thread adapted to threadedly receive said bolt, said internal thread having a thread portion adjacent said second face, and at least one dimple being stamped in said second face of said nut to form at least one deformity in said portion of said internal thread, said deformity in said portion of said internal thread bulging radially inwardly toward the axis of said bore, and said dimple being stamped radially outwardly from said portion so that said deformity does not form a break in said internal thread, wherein said deformity acts to limit the threaded advance of said nut along said bolt until an overcoming torque is applied;

(e) threading said nut onto said second end of said bolt until its threaded advancement is limited, by said deformity, with said bolt being threaded onto said nut from the direction of said first face;

(f) applying a torque to said nut to cause said bolt to rupture said capsule and thereby release and mix said resins;

(g) allowing said resins to set and secure the bolt to said rock structure; and (h) applying said overcoming torque to said nut to push said deformity radially outwardly from said axis to remove at least a portion of said deformity from said thread and thereby continue the threaded advance of said nut along said bolt.

BRIEF DESCRIPTION OF THE DRAWINGS

For a better understanding of the present invention, and to show more clearly how it may be carried into effect, reference will now be made, by way of example, to the accompanying drawings. The drawings show a preferred embodiment of the present invention, in which.

DETAILED DESCRIPTION OF THE PREFERRED EMBODIMENT

Figure 1:
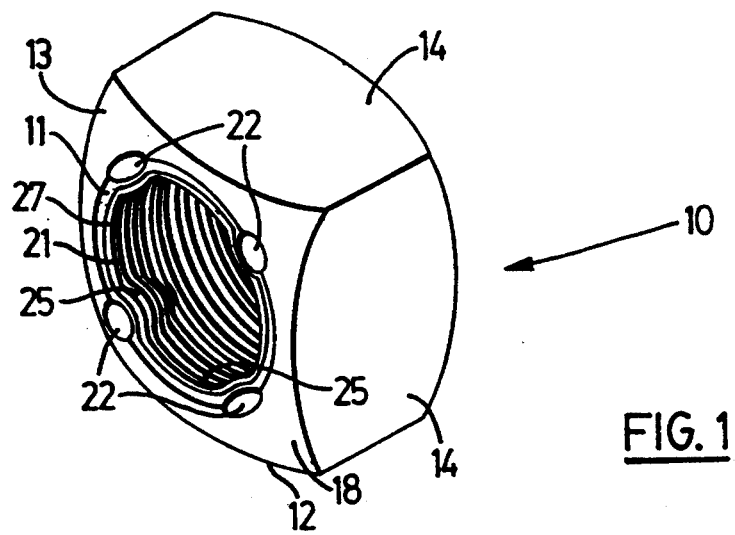
FIG. 1 is a perspective view of a nut with four deformities in its internal thread.

Referring to FIGS. 1–5, a nut in accordance with the present invention is generally depicted at 10. The nut 10 has a body 12 with four sides 14 and first and second parallel faces 16 and 18. The faces have a flat portion 11 and a rounded portion 13. The sides 14 act to define a surface for applying a torque to the body 12. Alternative configurations of the nut 10, for instance with a different number of sides 14 or with planar faces 16, 18, are conceivable.

Figure 6:
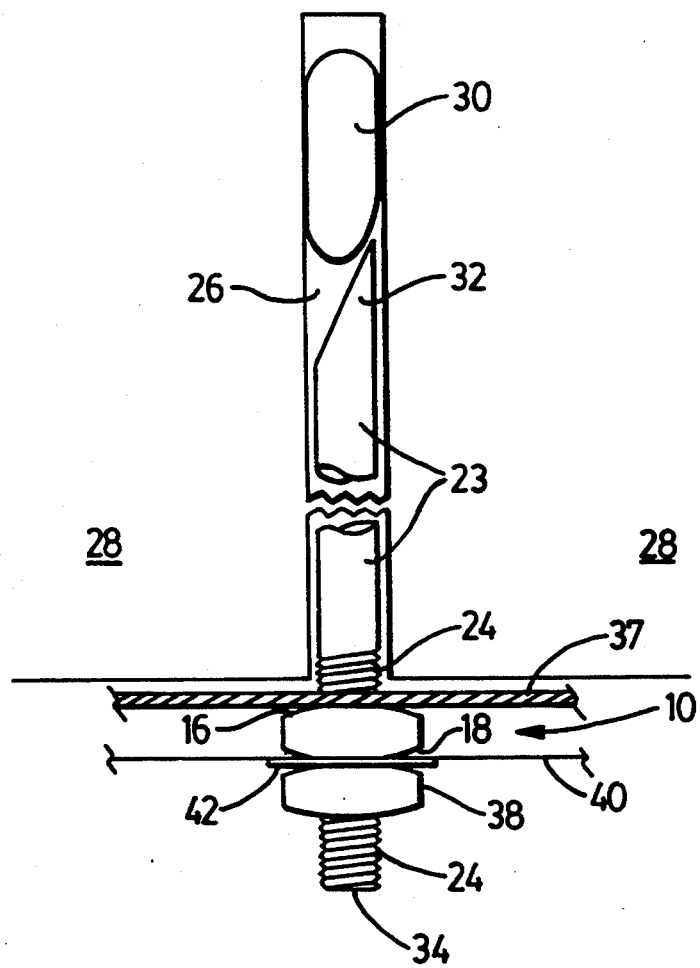
FIG. 6 is a sectional view of a bolt assembly installed in a hole.

A bore 20 is defined through the body 12 perpendicular to the first and second faces 16, 18. The bore 20 has a continuous internal thread 21 that is adapted to receive a bolt 23 having an external thread 24 as shown in FIG. 6. The bolt 23 is inserted into the bore 20 from the direction of the first face 16 of the nut 10. The nut 10 is free to advance several revolutions onto the bolt 23 until further advancement is limited.

The present invention contemplates a nut 10 having a ¾ inch, left-hand internal thread 21. If the nut 10 is hot forged, it should have a hardness of between C28 to C38 Rockwell. If no heat treatment is required, a hardness of between C8 to C15 Rockwell is sufficient. The nut 10 depicted in FIG. 4 has a width W of ¾ inches and a length L (the length of one side 14) of 1.1 inches.

The bolt 23 contemplated for use with the nut 10 should have at least approximately the same hardness as the nut 10, and preferably the same hardness as the nut 10.

Figure 5:
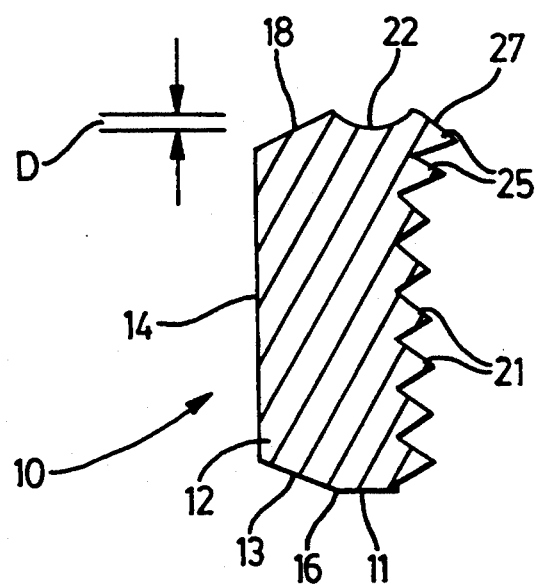
FIG. 5 is a sectional view of the nut taken along lines 5—5 in FIG. 3.

The flat portion 11 of the second face 18 of the nut 10 is stamped by a pneumatic or hydraulic stamping device (not shown) to cause deformities 25 in the continuous internal thread 21. The deformities 25 bulge inwardly toward the centre of the bore 20 as best shown in FIGS. 3 and 5.

The stamping device forms dimples 22 on the flat portion 11 of the second face 18 of the nut 10 to push the inner surface of the bore 20 inwardly to deform the internal thread 21. As shown in FIGS. 1–5, the dimples 22 are located radially outward from the sloping face 27 of the internal thread 21 and do not contact the sloping face 27. The dimples 22 are typically of a sufficient depth D to cause the deformity 25 in two courses of the internal thread 21.

The deformities act to limit the threaded advance of the nut 10 along the bolt 23 until an overcoming torque T is applied. Importantly, the dimples 22 do not damage the continuous internal thread 21 (i.e. they do not break or cut the thread). Instead, they simply deform it so that a greater torque is required to advance the nut 10. Because the deformed thread 21 remains continuous, i.e. without breaks, it is not likely to damage the external thread 24 on the bolt 23.

Figure 2:
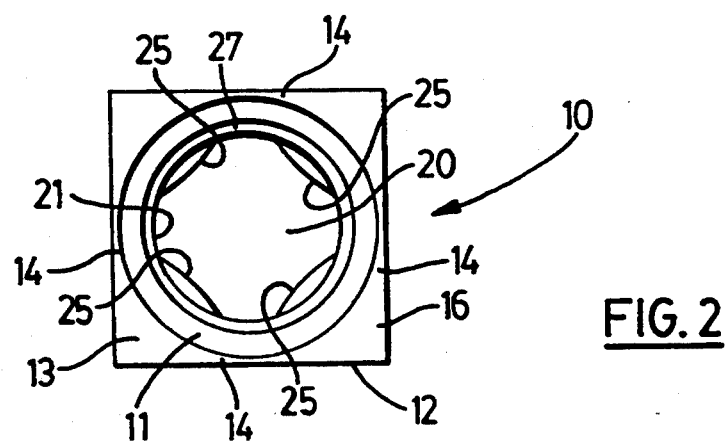
FIG. 2 is a view of the first face of the nut.
Figure 3:
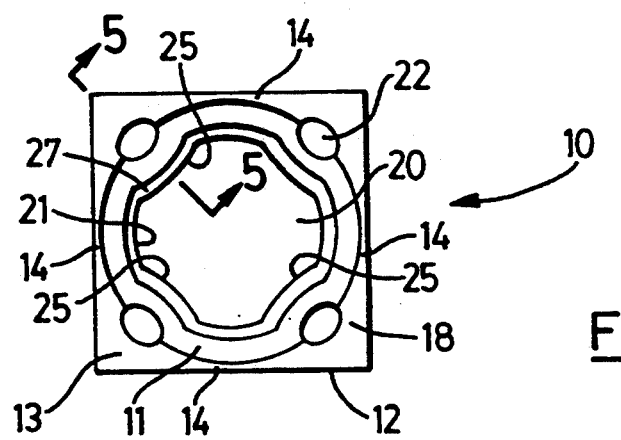
FIG. 3 is a view of the second face of the nut.
Figure 4:
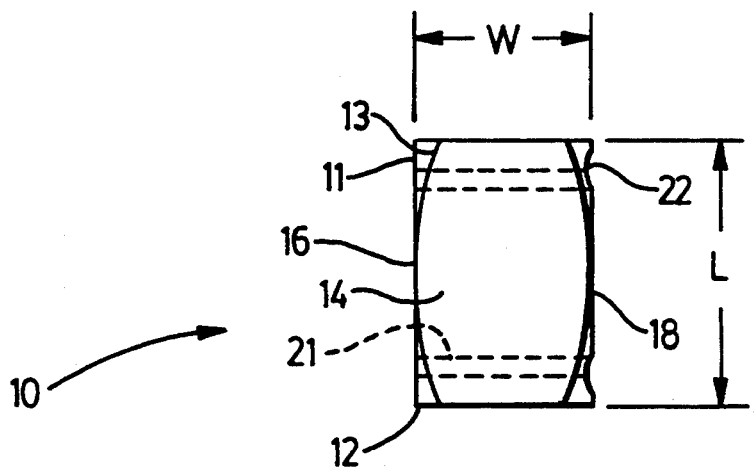
FIG. 4 is a view of one of the sides of the nut.

As shown in FIGS. 1–3, four dimples 22 are stamped onto the second face 18 of the nut 10. It is conceivable however that a greater or lesser number of dimples 22 may be applied to the second face 18 and thus a greater or lesser number of deformities created in the thread 21.

The greater the depth D of the dimples 22 in the second face 18, the greater the deformity caused in the internal thread 21 of the bore 20 and the greater the amount of the overcoming torque T needed. Thus, it is possible to tailor the nut 10 to a specific application by varying the stamping pressure to vary the depth D of the dimples 22. Also, the hardness of the nut may be varied, within the ranges suggested, to vary the depth D of the dimples 22 when a specific stamping pressure is applied.

For a type 1045 steel nut that is not heat treated and that has a Rockwell co-efficient of between C8 and C15, a dimple depth D of between 0.037 and 0.040 inches will sufficiently deform the internal thread in order that an overcoming torque T of 45 foot pounds ±5 foot pounds must be applied to advance the nut.

Operation

As shown in FIG. 6, a hole 26 is bored into a rock structure 28 of a mine and a thin-skinned resin capsule 30 is inserted therein. The capsule 30 contains unmixed quantities of a quick-setting adhesive resin (not shown) and a catalyst hardener resin (not shown). A bolt 23 is then inserted into the hole 26 such that a first end 32 of the bolt 23 contacts the resin capsule 30. The first end 32 of the bolt 23 is sheared to a point to assist rupturing of the capsule 30. A second end 34 of the bolt 23 extends from the hole 26 through an opening (not shown) in the roof or wall support 37.

The nut 10, as described in the present invention, is then threaded onto the lower end 34 of the bolt 23 (with undimpled face 16 first) until further advance of the nut 10 on the bolt 23 is limited by the deformities 25 of the internal thread 21. The limited advance of the nut 10 on the bolt 23 causes a unitary rotation of the nut 10 and bolt 23 when a torque is applied to the nut 10. This phenomenon is utilized to rotate the bolt 23 to rupture and mix the materials in the resin capsule 30. Once the resin materials are mixed, the torque is ceased and the resin mixture allowed to harden. The hardening process typically takes about two minutes or less.

Once the resin mixture hardens, the bolt 23 becomes anchored within the hole 26. At this point, a greater torque may be applied to the nut 10. When the overcoming torque T is applied, the deformities 25 in the thread 21 of the nut 10 are overcome, and the nut 10 will continue its advancement upon the bolt 23. The roof or wall support 37 may then be tightly secured against the rock structure 28.

Since the deformities 25 in the internal thread 21 of the nut 10 do not damage the external thread 24 of the bolt 23, a second nut 38 may be threaded onto the bolt 23 if desired. In effect, the overcoming torque T has pushed the bulges of deformities 25 radially outwardly, restoring the thread 21 on the nut 10 to a configuration part way back to its normal shape (i.e. without the deformities 25). A portion of each deformity 25 is thus removed (e.g. about half of each deformity). Then, as shown in FIG. 6, the second nut 38 may be used to suspend a screen 40 from the bolt 23 with the second end 34 of the bolt 23 being inserted through an opening (not shown) in the screen 40. Optionally, a washer 42 may be used to protect the screen from the second nut 38. The screen 40 helps to catch rock fragments that periodically fall from the rock structure 28.

It is to be understood that what has been described are preferred embodiments of the invention. The invention nonetheless is susceptible to certain changes and alternative embodiments fully comprehended by the spirit of the invention as described above, and the scope of the claims set out below.

I claim:

1. A method of attaching roof or wall supports to a rock structure of a mine with a bolt assembly, comprising the steps of:
   (a) forming a hole in said rock structure;
   (b) placing a capsule in said hole, said capsule containing unmixed quantities of a quick-setting adhesive resin and a catalyst hardener resin;
   (c) inserting a first end of a bolt into said hole, said bolt having a threaded second end extending from said hole and through an opening in a roof or wall support;
   (d) selecting a nut having a body having first and second parallel faces, and a plurality of sides extending between said faces to define a surface for applying a torque to said body, and a bore defined through said body perpendicular to said first and second faces, said bore having a continuous internal thread adapted to threadedly receive said bolt, said internal thread having a thread portion adjacent said second face, and at least one dimple being stamped in said second face of said nut to form at least one deformity in said portion of said internal thread, said deformity in said portion of said internal thread bulging radially inwardly toward the axis of said bore, and said dimple being stamped radially outwardly from said portion so that said deformity does not form a break in said internal thread, wherein said deformity acts to limit the threaded advance of said nut along said bolt until an overcoming torque is applied;
   (e) threading said nut onto said second end of said bolt until its threaded advancement is limited by said deformity, with said bolt being threaded onto said nut from the direction of said first face;
   (f) applying a torque to said nut to cause said bolt to rupture said capsule and thereby release and mix said resins;
   (g) allowing said resins to set and secure the bolt to said rock structure; and
   (h) applying said overcoming torque to said nut to push said deformity radially outwardly from said axis to remove at least a portion of said deformity from said thread and thereby continue the threaded advance of said nut along said bolt.

2. A method as claimed in claim 1, further comprising the steps of:
   (h) inserting said second end of said bolt through an opening in a screen; and
   (i) threading a second nut onto said second end of said bolt to hold said screen.

3. A as claimed in claim 1, wherein the number of said dimples is four.

4. A method as claimed in claim 3, wherein said dimples each have a depth of between 0.37 and 0.40 inches.

5. A method as claimed in claim 1, wherein each of said dimples is formed having a rounded cross-sectional surface.

* * * * *